No. 12,065. Reissued Dec. 23, 1902.

I. P. DOOLITTLE.

COVER FASTENING FOR FRUIT JARS OR SIMILAR VESSELS.

(Application filed Nov. 12, 1901.)

Witnesses:
F. F. Schurzmann
E. A. Volk.

I. P. Doolittle Inventor.
By Wilhelm Bonner
Attorneys.

UNITED STATES PATENT OFFICE.

IRVIN P. DOOLITTLE, OF TORONTO, CANADA, ASSIGNOR OF ONE-HALF TO EUGENE COSTE AND GEORGE RITCHIE, OF TORONTO, CANADA.

COVER-FASTENING FOR FRUIT-JARS OR SIMILAR VESSELS.

SPECIFICATION forming part of Reissued Letters Patent No. 12,065, dated December 23, 1902.

Original No. 640,182, dated January 2, 1900. Application for reissue filed November 12, 1901. Serial No. 82,054.

*To all whom it may concern:*

Be it known that I, IRVIN P. DOOLITTLE, a citizen of the United States, residing at Toronto, in the county of York, in the Province of Ontario, Dominion of Canada, have invented new and useful Improvements in Cover-Fastenings for Fruit-Jars or Similar Vessels, (for which I have obtained a patent in Canada, No. 61,416, bearing date October 17, 1898,) of which the following is a specification.

This invention relates to the locks or fastenings employed for clamping the covers of fruit-jars and the stoppers of bottles in place, and more particularly to a fastening of this kind designed for use in connection with a cap which fits over the mouth of a bottle or jar.

The object of my invention is the provision of a simple and inexpensive locking device of this character which firmly and reliably clamps the cover to the jar, so as to produce a tight joint or seal and which can at the same time be easily unlocked for releasing the cover.

Figure 1:
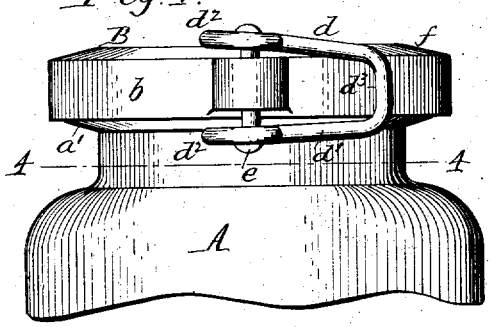
Figure 3:
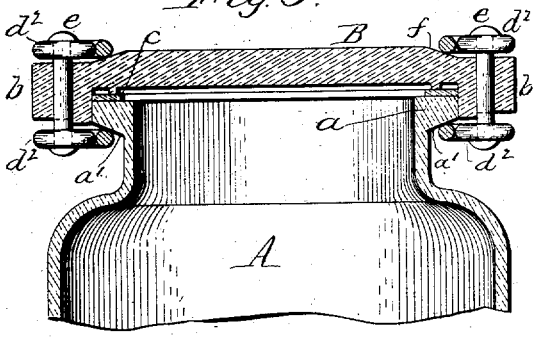
Figure 2:
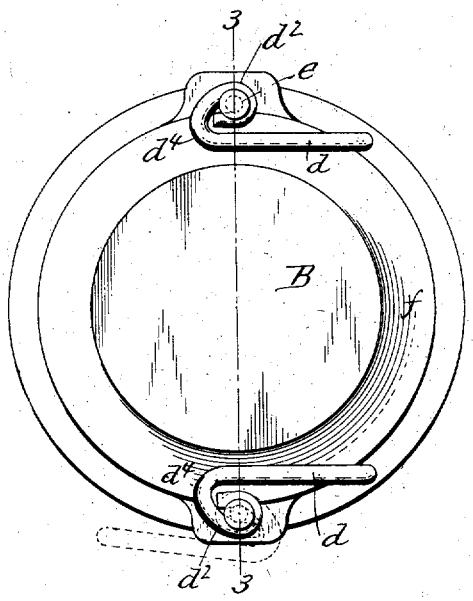
Figure 4:
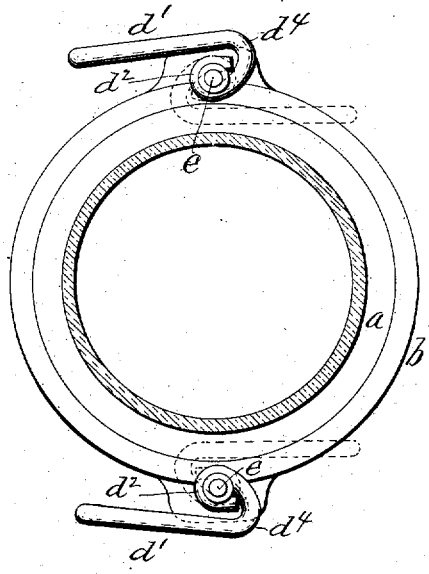

In the accompanying drawings, Figure 1 is a fragmentary side elevation of a jar provided with my improved fastening. Fig. 2 is a top plan view thereof. Fig. 3 is a vertical section in line 3 3, Fig. 2. Fig. 4 is a horizontal section in line 4 4, Fig. 1, looking upwardly, showing the cover unlocked.

Like letters of reference refer to like parts in the several figures.

A is a jar, bottle, or similar vessel which is provided at or near its upper end with a rim or outwardly-projecting flange *a*, and B is the cap or cover of the jar, having a depending flange *b*, which fits snugly over the rim of the jar. A rubber packing ring or gasket *c* is interposed between the under side of the cap and the flat upper surface of the rim *a*, as shown. The cap is removably fastened to the jar by a pair of locking devices preferably arranged at diametrically opposite sides of the cover, as shown in Figs. 2 and 4, and each is composed of a pair of horizontally-swinging arms or levers *d d'*, arranged one above the other and mounted at their inner ends upon an upright pivot pin or rivet *e*, which passes through a perforated lug or ear projecting from the edge of the cap. The inner portions of the arms *d d'* terminate in eyes $d^2$, which encircle the pivot *e* and which are retained therein by heading or upsetting the ends of the pin, and the free outer ends of the arms are connected by an upright bar $d^3$, which serves as a thumb-piece for locking and releasing the arms. The eyes of the locking arms are offset or arranged eccentrically on the outer sides of the arms in the locked position of the latter, as shown in Figs. 1, 2, and 3, so that when the fastenings are swung inwardly to this position the inner portions of the arms and the inner sides of their eyes engage under the rim *a* of the jar and retain the cover thereon, while when the arms are swung outwardly to the position shown in dotted lines in Fig. 2 and by full lines in Fig. 4 the arms and their eyes clear the jar-rim and release the cover. As shown in the drawings, the bends $d^4$ at the junction of the arms *d'* and eyes $d^2$ extend inwardly a sufficient distance to engage under the rim of the jar in the locked position of the arms. The two arms *d d'*, their eyes $d^2$, and the connecting-bar $d^3$ are preferably bent from a single piece of comparatively heavy wire.

In order to cause the locking-arms to tightly clamp the cap upon the jar, the under side of the jar-rim is inclined or beveled, as shown at *a'*, so that in locking the fastenings their lower arms are wedged or sprung downwardly by the beveled face of the rim, thereby firmly drawing the cap down upon the upper flat face of the rim and compressing the packing-ring *c* and forming a reliable seal. In order to render this clamping action more effective, the cap is provided on its upper side, near its edge, with a beveled or outwardly sloping face *f*, over which the upper arm *d* of each locking device rides in locking the cover. The pivot-pins of the arms *d d'* are preferably free to slide vertically in their openings in the cap, and in swinging the arms inwardly for clamping the cap the upper arms by riding up the beveled face of the cap tend to draw the pivot-pins upwardly, thereby causing the lower arms to bind more tightly against the beveled face of the jar-rim.

The levers *d d'* bear respectively upon the cover and against the under side of the rim of the vessel or jar by their bends or elbows $d^4$. The latter have a cam-like action by which the cover is tightly drawn against and clamped to the vessel. As the arms are constructed of wire and connected at their outer ends by the bar $d^3$, they have a certain amount of elasticity which permits their eyes $d^2$ and cam-bends $d^4$ to spring farther apart as they are forced upon the beveled faces of the cover and the jar-rim and whereby they firmly grip these surfaces and effect a tight and reliable closure of the cover. As shown, the pivots *e* of the clips project a sufficient distance above and below the lugs of the cover to permit of this action of the eyes and bends.

It is obvious that my improved locking device is applicable to the caps or stoppers of bottles and similar vessels as well as jars.

I claim as my invention—

1. The combination with a jar or vessel having a projecting rim at its open end and a cap or cover, of a fastening-clip connected with the cap or cover by a vertical pivot and provided with an upper and a lower arm adapted to bear respectively upon the cover and against said rim, each arm of the clip constituting an elbow-lever which bears against the cover or rim by its elbow portion arranged between the pivoted and free ends of the arm, substantially as set forth.

2. The combination with a jar or vessel having a projecting rim at its open end and a cap or cover, of a fastening-clip connected with the cap or cover by a vertical pivot and provided with an upper and a lower arm adapted to bear respectively upon the cover and against said rim, each arm of the clip constituting an elbow-lever which bears against the cover or rim by its elbow portion arranged between the pivoted and free ends of the arm and both arms being united outside of the cover, substantially as set forth.

3. The combination with a jar or similar vessel provided at its upper end with a projecting rim having a beveled under side, of a cap or cover provided on its upper side with a beveled marginal face, and a fastening applied to the cover and consisting of an upright pivot carried by the marginal portion of the cover and a pair of connected horizontally-swinging arms provided at their inner ends with eyes which encircle the projecting upper and lower ends of said pivot and adjacent to said eyes with offset or eccentric bends which are forced up on the beveled faces of the cover and jar-rim in closing the fastening and which clear said faces in the open position of the fastening, substantially as set forth.

4. The combination with a jar or similar vessel provided at its upper end with a projecting rim, of a cap or cover and a fastening applied to the cover and consisting of an upright pivot carried by the marginal portion of the cover and projecting above and below the same and a pair of horizontally-swinging arms provided at their inner ends with offset eyes which encircle the projecting portions of said pivot and an upright bar connecting the outer portions of said arms, said eyes being adapted to bear against the upper side of the cover and the under side of the jar-rim, respectively, and the arms with their eyes and connecting-bar being bent from a single length of wire, substantially as set forth.

5. The combination with a jar or similar vessel provided at or near its upper end with a projecting rim having a beveled under side, of a cap or cover provided on its upper side with a beveled or outwardly-inclined face, and a fastening applied to the cover and consisting of a pair of horizontally-swinging arms mounted on a vertical pivot carried by the cover and adapted to engage against the beveled faces of the cover and the jar-rim, each of said arms being provided at its inner end with an eye or enlargement which encircles said pivot and the outer ends of the arms being connected by an upright bar forming a thumb-piece, substantially as set forth.

Witness my hand this 1st day of November, 1901.

IRVIN P. DOOLITTLE.

Witnesses:
JNO. J. BONNER,
CLAUDIA M. BENTLEY.